(12) United States Patent
Shibazaki et al.

(10) Patent No.: US 6,621,884 B2
(45) Date of Patent: Sep. 16, 2003

(54) METHOD OF MONITORING NEUTRON SENSITIVITY OF NEUTRON DETECTOR

(75) Inventors: Masato Shibazaki, Yaita (JP); Yutaka Tanaka, Otawara (JP); Shigehiro Kono, Zushi (JP); Atsushi Kimura, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/849,346

(22) Filed: May 7, 2001

(65) Prior Publication Data

US 2003/0142776 A1 Jul. 31, 2003

(30) Foreign Application Priority Data

May 10, 2000 (JP) ........................................ 2000-137017
Jan. 23, 2001 (JP) ........................................ 2001-014051

(51) Int. Cl.[7] .............................................. G01T 1/00
(52) U.S. Cl. .................... 376/154; 376/153; 250/390.01
(58) Field of Search ........................ 376/154; 250/390, 250/252

(56) References Cited

U.S. PATENT DOCUMENTS

| | | | | |
|---|---|---|---|---|
| 3,742,274 A | * | 6/1973 | O'Boyle et al. | ............... 313/61 |
| 3,760,183 A | * | 9/1973 | Neissel | ....................... 250/252 |
| 4,410,483 A | * | 10/1983 | Tomoda | ....................... 376/154 |
| 4,963,315 A | * | 10/1990 | Bednar et al. | ............... 376/154 |

FOREIGN PATENT DOCUMENTS

| | | | |
|---|---|---|---|
| JP | 63-56956 | 4/1981 | ................. 376/154 |
| JP | 63-56956 | 11/1988 | |

OTHER PUBLICATIONS

Kimura et al., "A New Method to Determine the Neutron Sensitivity of a Micro Fission Chamber for a Boiling Water Reactor," *Nuclear Technology*, vol. 136, Nov. 2001, pp. 197–203.
Kobayashi et al., "Neutron Detector for BWR," *Toshiba Review*, vol. 34, No. 10, 1979, pp. 844–847.
Keithley Catalog, U.S. Cleaveland Corporation.

* cited by examiner

Primary Examiner—Michael J. Carone
Assistant Examiner—R Palabrica
(74) Attorney, Agent, or Firm—Pillsbury Winthrop LLP

(57) ABSTRACT

Disclosed is a method of monitoring the neutron sensitivity of a neutron detector. Voltage having a predetermined potential difference is applied between an anode and a cathode without irradiating the neutron detector with neutrons to permit an α-ray to be emitted from the nuclear fission substance. The α-ray ionizes the ionizing gas to form an α-ray current ($I\alpha$) flowing between the anode and the cathode. The current ($I\alpha$) thus formed is monitored. Also, with the monitoring region in which the applied voltage and the α-ray current ($I\alpha$) bear a substantially proportional relationship, obtained is an extrapolated zero-volt α-ray current ($I\alpha_0$) at 0V of the applied voltage between the anode and the cathode from the proportional relationship by an extrapolating method, and the extrapolated zero-volt α-ray current ($I\alpha_0$) is correlated with the neutron sensitivity.

5 Claims, 3 Drawing Sheets

METHOD OF MONITORING NEUTRON SENSITIVITY OF NEUTRON DETECTOR

CROSS-REFERENCE TO RELATED APPLICATIONS

This application is based upon and claims the benefit of priority from the prior Japanese Patent Applications No. 2000-137017, filed May 10, 2000; and No. 2001-014051, filed Jan. 23, 2001, the entire contents of both of which are incorporated herein by reference.

BACKGROUND OF THE INVENTION

The present invention relates to a method of monitoring the neutron sensitivity of a neutron detector.

A general neutron detector, e.g., a nuclear fission ionization box, for monitoring the neutron flux in an atomic power station includes an anode 11 and a cathode 12 housed in a chamber 10, as schematically shown in FIG. 1. The surface of at least one of the anode and the cathode is coated with a nuclear fission substance 13, and an ionizing gas is loaded in the space between the anode 11 and the cathode 12 within the chamber 10. A DC power source 15 is connected to the anode and the cathode with an ammeter 14 arranged between the anode 11 and the DC power source 15.

If the nuclear fission ionization box of the construction described above is irradiated with neutrons Y, the ionizing gas is ionized by the nuclear fission pieces. The ions and electrons formed by the ionization are collected to the anode and the cathode, with the result that an electric current flows between the anode and the cathode. The current flowing between the anode and the cathode is measured by the ammeter 14, and the neutron flux is monitored by utilizing the fact that the magnitude of the current is proportional to the neutron flux.

In the case of the nuclear fission ionization box, the neutron flux is monitored by utilizing the fact that the current flowing between the anode and the cathode is proportional to the neutron flux irradiating the nuclear fission ionization box. Therefore, in the nuclear fission ionization box, the nuclear sensitivity is monitored in advance, and the neutron flux is monitored on the basis of the neutron sensitivity monitored in advance.

In the conventional method of monitoring the neutron sensitivity of the nuclear fission ionization box, the nuclear fission ionization is irradiated with neutrons by utilizing, for example, an atomic furnace, and the neutron sensitivity is obtained on the basis of the relationship between the amount of the irradiating neutrons and the current flowing between the anode and the cathode of the nuclear fission ionization box.

The conventional method gives rise to the problems that the number of atomic furnaces or the like used for irradiating the nuclear fission ionization box with neutrons is decreased, and that it is necessary to transfer the nuclear fuel substance to the outside of the radiation supervising area. In addition, the workers suffer from a radiation exposure accompanying the neutron irradiation, resulting in increases in the number of steps and cost for monitoring the neutron sensitivity.

A method that may overcome the above-noted problems is proposed in, for example, Japanese Patent Publication (Kokoku) No. 63-56956. It is proposed that a specified element is mixed the nuclear fission substance attached to at least one of the anode and the cathode. In this case, voltage is applied between the anode and the cathode so as to monitor the α-ray current without actually irradiating the nuclear fission ionization box with neutrons, and the soundness of the nuclear fission type neutron detector and the neutron sensitivity are examined on the basis of the α-ray current characteristics. In this method, however, it is difficult to obtain the neutron sensitivity with a high accuracy because of, for example, the nonuniformity in the size between the electrodes of the neutron detector and in the insulation resistance generated in the cable. Therefore, a further improvement is required.

BRIEF SUMMARY OF THE INVENTION

An object of the present invention is to provide a method of monitoring the neutron sensitivity of a neutron detector, which permits monitoring with a high accuracy the neutron sensitivity of the neutron detector without involving the neutron irradiation.

According to one embodiment of the present invention, there is provided a method of monitoring the neutron sensitivity of a neutron detector, in which at least one of an anode and a cathode arranged to face each other is coated with a nuclear fission substance containing a parent nuclear species and an ionizing gas is loaded in the space between the anode and the cathode, comprising the steps of applying voltage of a predetermined potential difference between the anode and the cathode under the state that the nuclear detector is not irradiated with neutrons so as to measure an α-ray current ($I\alpha$) flowing between the anode and the cathode by the ionization of the ionizing gas caused by the α-ray emitted from a nuclear fission substance; and obtaining, with the monitoring region in which the applied voltage and the α-ray current ($I\alpha$) bear a substantially proportional relationship within at least 50V of the applied voltage used as a reference, an extrapolated zero-volt α-ray current ($I\alpha_0$) at 0V of the applied voltage between the anode and the cathode from the proportional relationship by an extrapolating method, and by correlating the extrapolated zero-volt α-ray current ($I\alpha_0$) with the neutron sensitivity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
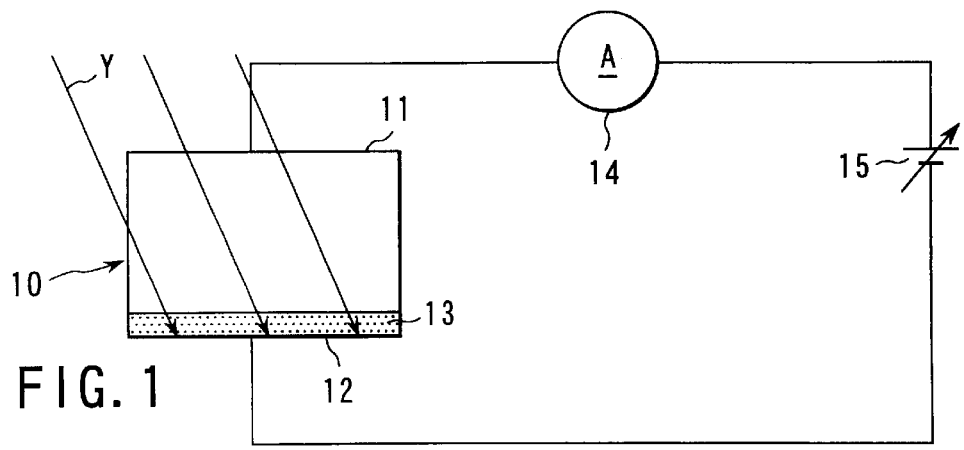
FIG. 1 schematically shows the construction of a general ionization boxy type neutron detector.
Figure 2:
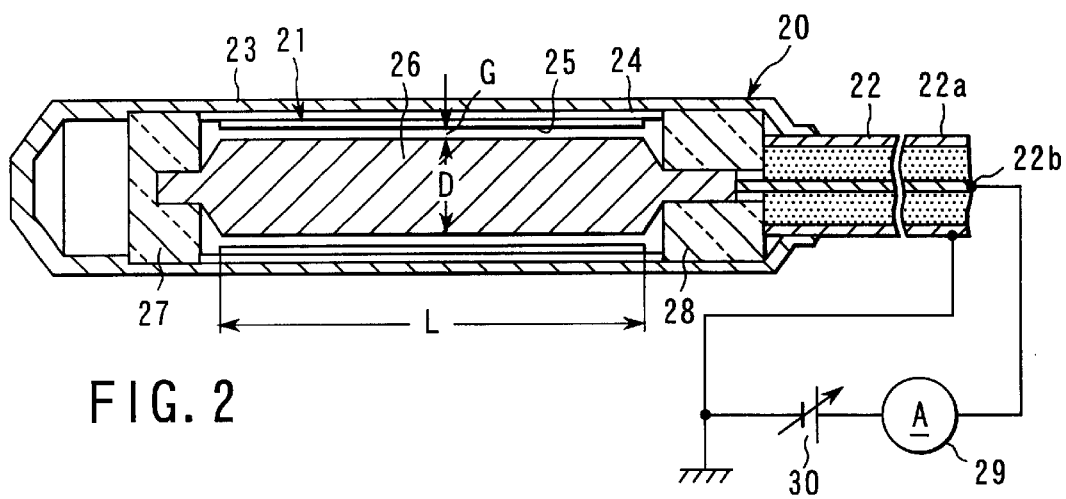
FIG. 2 is a vertical cross sectional view schematically showing the ionization box type neutron detector to which is applied a method of the present invention for monitoring the neutron sensitivity of the neutron detector.

The method of measuring the neutron sensitivity of a neutron detector according to one embodiment of the present invention will now be described with reference to FIG. 2. Specifically, FIG. 2 shows a nuclear fission ionization box type neutron detector 20. In the neutron detector 20, a detector body portion 21 and a coaxial cable 22 are formed integral. In the detector body portion 21, a cylindrical cathode 24 made of, for example, titanium is arranged contiguous to the inner wall of a cylindrical vacuum vessel 23 made of, for example, a stainless steel. Also, the inner circumferential surface of the cathode 24 is coated with a nuclear fission substance 25.

Further, a columnar anode 26 made of, for example, a stainless steel is arranged in the inner portion of the vacuum vessel 23. The both end portions of the columnar anode 26 are supported by ceramics insulators 27, 28 such that a cylindrical space having a predetermined clearance G is provided between the outer surface of the columnar anode 26 and the nuclear fission substance 25 of the cathode 24. The columnar anode 26 is arranged coaxial with and electrically insulated from the cathode 24. An ionizing gas such as an argon gas is loaded in the clearance between the anode 26 and the cathode 24. Each of the cathode 24 and the vacuum vessel 23 is connected to an outer conductor 22a of the coaxial cable 22, and the anode 26 is connected to an inner conductor 22b of the coaxial cable 22. In general, the coaxial cable 22 is at least 10 meters long.

During monitoring of the characteristics described below and when the neutron detector 20 is actually used, a variable DC power source 30 is connected between the anode 26 and the cathode 24 with an ammeter 29 interposed therebetween.

The diameter D of the anode 26 is, for example, 3 mm. The length L of the effective operating region of each of the cathode 24 and the anode 26 is, for example, 25 mm. The clearance G (one side) between the cathode 24 and the anode 26 is, for example, 0.25 mm. Further, the pressure of the ionizing gas is, for example, 1 atm (about $1 \times 10^5$ Pa). The nuclear fission substance 25 is formed of a mixture consisting mainly of U-235 and U-234 for prolonging the life of the neutron detector.

If the detector body portion 21 of the construction described above is irradiated with neutrons, nuclear fission takes place in the nuclear fission substance, and the ionizing gas is ionized by the nuclear fission pieces. The ions and electrons formed by the ionization are collected by the anode and the cathode, with the result that current flows between the anode and the cathode. In this case, the neutron flux is monitored on the basis of the neutron sensitivity monitored in advance by utilizing the fact that the magnitude of the current flowing between the anode and the cathode is proportional to the neutron flux.

In the case of the nuclear fission ionization box type neutron detector, it is known to the art that the neutron sensitivity is proportional to the amount of the nuclear fission substance, the distance between the anode and the cathode, and the ionizing gas pressure. Also, even under the state that the nuclear fission ionization box type nuclear detector is not irradiated with neutrons, α-ray is emitted from the nuclear fission substance coated on the anode or the cathode so as to ionize the ionizing gas, with the result that a weak α-ray current flows between the anode and the cathode.

Figure 3:
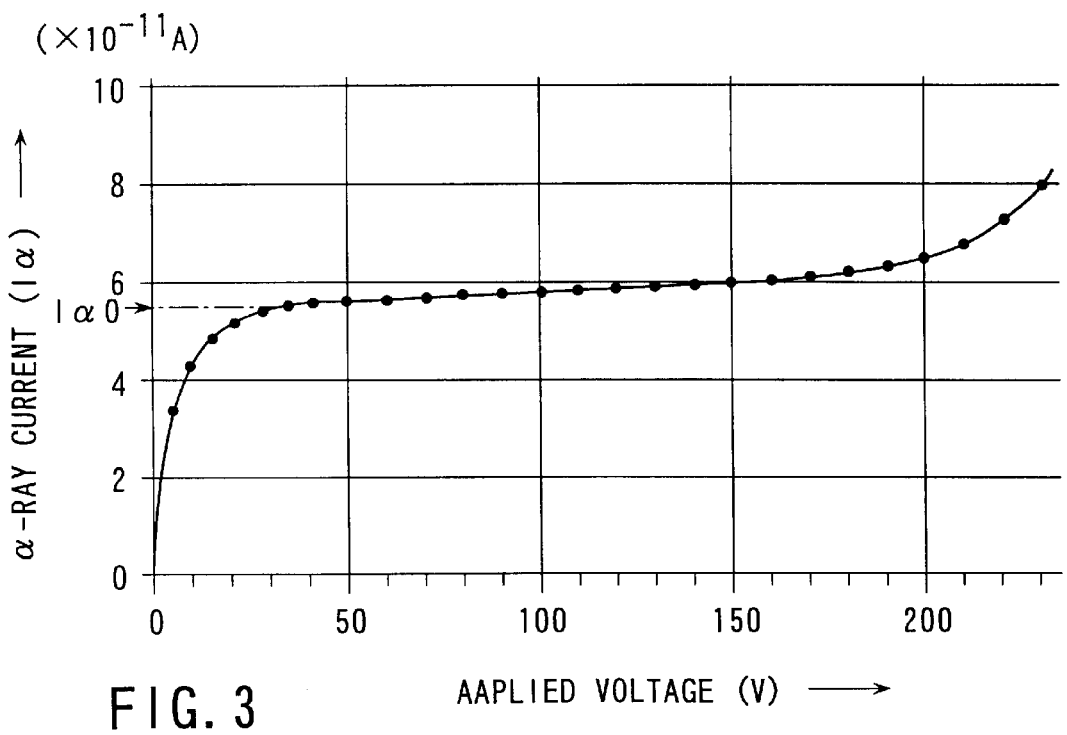
FIG. 3 is a graph showing the relationship between the voltage applied to the neutron detector and an α-ray current ($I\alpha$) and for explaining how to obtain an extrapolated zero-volt α-ray current ($I\alpha_0$) from the particular relationship.

An α-ray current ($I\alpha$) was monitored by changing the voltage applied between the anode and the cathode under the state that the nuclear fission ionization box type nuclear detector shown in FIG. 2 was not irradiated with neutrons. FIG. 3 is a graph showing the result. In the graph of FIG. 3, a DC voltage applied between the anode and the cathode is plotted on the abscissa, with the α-ray current ($I\alpha$) being plotted on the ordinate.

As shown in FIG. 3, the α-ray current is rapidly increased when the applied voltage is increased from 0V to 40V to 60V and, then, the α-ray current is moderately increased when the applied voltage exceeds about 60V. It is considered reasonable to understand that, where the applied voltage falls within a range of between 0V and about 40V, the ions and electrons generated by the ionization caused by the α-ray are not sufficiently trapped by the anode and the cathode, with the result that the α-ray current is rapidly increased with increase in the applied voltage.

Where the applied voltage falls within a range of between about 40V to 60V and about 180V to 200V, the α-ray current is slightly increased with increase in the applied voltage. Also, the applied voltage is substantially proportional to the α-ray current ($I\alpha$). It is considered reasonable to understand that the α-ray current is slightly increased with increase in the applied voltage by the influence of mainly the resistance of the inner and outer conductors of the coaxial cable and the leak current.

Further, if the applied voltage is increased to exceed about 200V, the α-ray current ($I\alpha$) is increased relatively sharply with increase in the applied voltage. It is considered reasonable to understand that, if the applied voltage is excessively high, the discharge current is generated from a part of the ionizing gas present between the anode and the cathode so as to increase the α-ray current.

As described above, the applied voltage and the α-ray current ($I\alpha$) are substantially proportional to each other in the region where the applied voltage falls within a range of between about 40V and about 200V, particularly, between about 60V and about 180V. The particular region is extended by an extrapolating method so as to calculate or estimate the α-ray current ($I\alpha_0$) at the applied voltage of 0V. The α-ray current thus calculated or estimated is defined as an extrapolated zero-volt α-ray current ($I\alpha_0$). The extrapolated zero-volt α-ray current is obtained by an extrapolating method from the region in which the applied voltage and the α-ray current ($I\alpha$) are substantially proportional to each other under the condition that the applied voltage has a potential difference of at least 50V.

It has been known in the art of radiation measurement that the α-ray current ($I\alpha_0$) is proportional to each of the amount of the nuclear fission substance, the distance between the anode and the cathode, and the ionizing gas pressure. Therefore, in the case of the nuclear fission ionization box type neutron detector, it has been found that the extrapolated zero-volt α-ray current ($I\alpha_0$) and the neutron sensitivity by the actual neutron irradiation are proportional to each other such that, if one is increased or decreased, the other is also increased or decreased.

Figure 4:
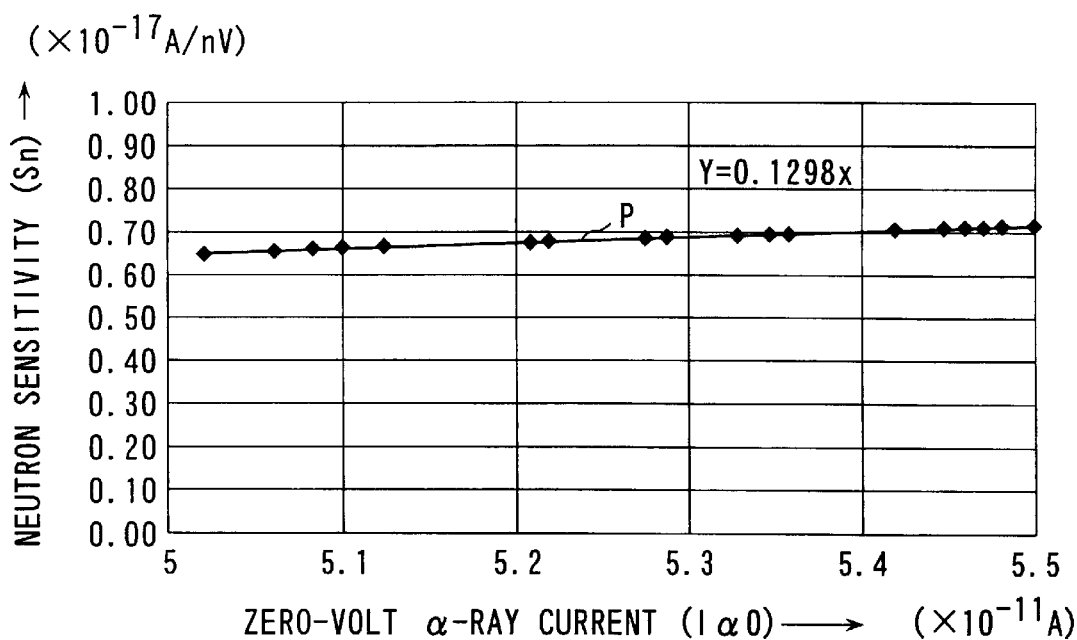
FIG. 4 is a graph showing the relationship between an extrapolated zero-volt α-ray current ($I\alpha_0$) and the neutron sensitivity (Sn) for explaining the method of the present invention for monitoring the neutron sensitivity of a neutron detector.

FIG. 4 is a graph exemplifying the relationship between the extrapolated zero-volt α-ray current ($I\alpha_0$) and the neutron sensitivity. The extrapolated zero-volt α-ray current ($I\alpha_0$) with a unit of $10^{-11}$ A is plotted on the abscissa (x-axis) of the graph, with the neutron sensitivity Sn with a unit of $10^{-17}$ A/nV being plotted on the ordinate (y-axis). The relationship between the extrapolated zero-volt α-ray current ($I\alpha_0$) and the neutron sensitivity Sn, i.e., the relationship on a so-called "perpendicular coordinates", is represented by, for example, y=0.1298x as denoted by a letter P, supporting that the extrapolated zero-volt α-ray current ($I\alpha_0$) and the neutron sensitivity Sn bear a satisfactory proportional relationship.

If the relationship between the extrapolated zero-volt α-ray current ($I\alpha_0$), which is plotted on the abscissa of the graph shown in FIG. 4, and the neutron sensitivity Sn, which is plotted on the ordinate, is obtained in respect of the nuclear fission ionization box of a specified type, the neutron sensitivity Sn can be obtained by multiplying the extrapolated zero-volt α-ray current ($I\alpha_0$) by the coefficient of the relationship, e.g., the gradient of the relationship, which is 0.1298 in the case of FIG. 4.

Incidentally, in the nuclear fission ionization box type neutron detector of the particular construction, a certain current flows between the anode and the cathode regardless of the applied voltage in the case where there is no leak current. It follows that the extrapolated zero-volt α-ray current ($I\alpha_0$) of the nuclear fission ionization box type neutron detector, in which there is no leak current, is determined by the magnitude of the current flowing between the anode and the cathode when a predetermined voltage is applied between the anode and the cathode.

Of course, even in the case of a nuclear fission ionization box type neutron detector in which there is no leak current, it is possible to determine the extrapolated zero-volt α-ray current ($I\alpha_0$) by monitoring the magnitude of the α-ray current flowing between the anode and the cathode in the case of applying a plurality of different levels of voltage between the anode and the cathode. In other words, the extrapolated zero-volt α-ray current ($I\alpha_0$) can be obtained by an extrapolating method approximating to a straight line by plotting on perpendicular coordinates the relationship between a plurality of voltages and the magnitude of the current.

However, where the leak current relative to the α-ray current of the nuclear fission ionization box type neutron detector is not negligible, the α-ray current relative to the applied voltage comes to have a relatively large inclination under the influence of the leak current if the applied voltage is changed.

Figure 5:
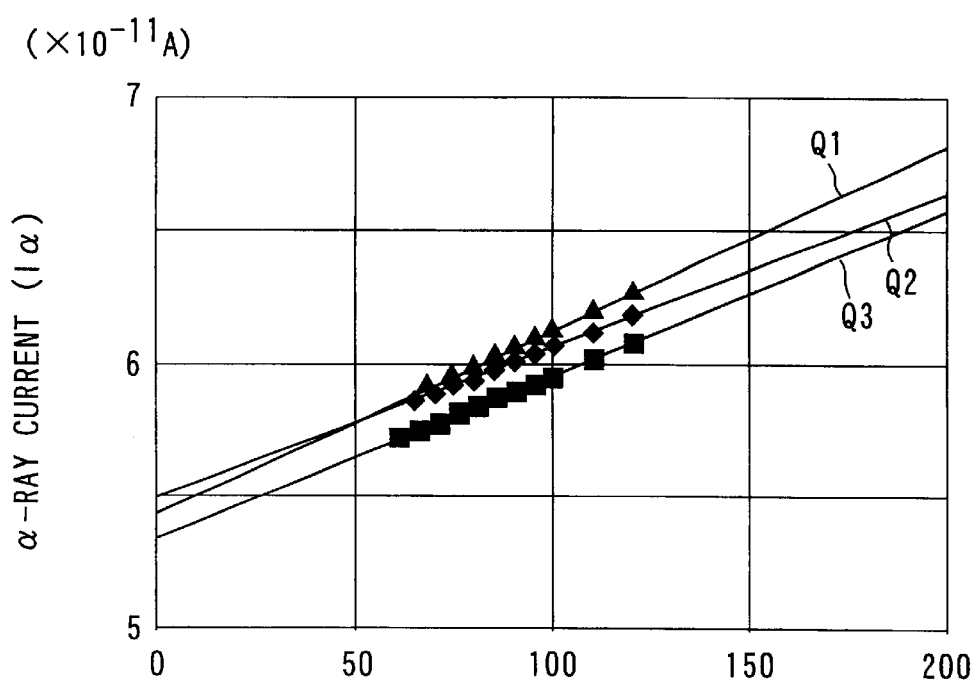
FIG. 5 is a graph showing the relationship between the voltage applied to a nuclear fission ionization box and the α-ray current, covering the case where the leak current relative to the α-ray current of the nuclear fission ionization box is not negligible, for explaining the method of the present invention for monitoring the neutron sensitivity of a neutron detector.

Under the circumstances, FIG. 5 exemplifies the relationship between the applied voltage and the extrapolated zero-volt α-ray current ($I\alpha_0$), covering the case where the leak current is not negligible. The voltage with a unit of V, which is applied between the anode and the cathode, is plotted on the abscissa of the graph shown in FIG. 5, with the α-ray current with a unit of $10^{-11}$ A being plotted on the ordinate. Symbols Q1, Q2 and Q3 shown in FIG. 5 cover the cases where the extrapolated zero-volt α-ray currents ($I\alpha_0$) are, for example, $5.42 \times 10^{-11}$ A, $5.48 \times 10^{-11}$ A and $5.33 \times 10^{-11}$ A, respectively.

As shown in FIG. 5, where the leak current relative to the α-ray current is not negligible, the α-ray current ($I\alpha$) has an inclination relative to the change in the applied voltage because of the influence of the leak current. Therefore, if the α-ray current is monitored under a single applied voltage, an error is generated by the leak current.

As described above, where the leak current is not negligible, the α-ray current ($I\alpha$) is monitored under a plurality of different voltage values differing from each other in the magnitude of the applied voltage by changing, for example, the applied voltage. If the relationship between the α-ray current ($I\alpha$) and the applied voltage is shown on perpendicular coordinates in which the applied voltage is plotted on the abscissa, with the α-ray current ($I\alpha$) being plotted on the ordinate as shown in FIG. 5, it is possible to obtain an estimated α-ray current, i.e., extrapolated zero-volt α-ray current ($I\alpha_0$), by the so-called extrapolating method by eliminating the effect of the leak current.

Since the extrapolated zero-volt α-ray current ($I\alpha_0$) is proportional to the neutron sensitivity, it is possible to obtain the neutron sensitivity from the relationship between the extrapolated zero-volt α-ray current ($I\alpha_0$) and the neutron sensitivity. Also, this method permits eliminating an error caused by the leak current.

It is appropriate for the applied voltage for monitoring the α-ray current ($I\alpha$) without employing the neutron irradiation to fall within a range of between 40V and 200V, preferably between 60V and 150V. In this case, it is possible to monitor with a high accuracy the α-ray current ($I\alpha$) by substantially eliminating the other undesired influences. In addition, it is possible to obtain a substantial proportional relationship between the applied voltage and the α-ray current ($I\alpha$), making it possible to obtain the extrapolated zero-volt α-ray current ($I\alpha_0$) with a high accuracy by the extrapolating method.

Incidentally, in practice, the resistance of the coaxial cable is not uniform and the leak current generation in various parts of the neutron detector is not negligible in some cases. Therefore, in actually monitoring the extrapolated zero-volt α-ray current ($I\alpha_0$), it may be necessary to monitor the α-ray current ($I\alpha$) by different applied voltages in at least two points. If the α-ray current is monitored in two points, it is possible to know the inclination of the α-ray current, making it possible to obtain the extrapolated zero-volt α-ray current ($I\alpha_0$) by, for example, the extrapolating method. In this case, the proportional region can be grasped clearly with increase in the number of applied voltage values for monitoring the α-ray current. Also, the effect of the true α-ray current, i.e., the extrapolated zero-volt α-ray current ($I\alpha_0$), on the monitoring error in each monitoring point is decreased. However, the effect of the error reduction on the monitoring point is gradually diminished even if the monitoring points are increased. Therefore, it is practical to set the upper limit of the monitoring points at about 20 points in view of the time required for monitoring the α-ray current and the monitoring accuracy.

The nuclear fission substances include U-235, Pu-239, etc. These are α-ray decay nuclear species differing from each other in the half-life and the amount of the α-ray emission relative to the amount of the substance. These substances contain impurity elements and isotope elements. If the lot of the nuclear fission substance for manufacturing the neutron detector differs, the true α-ray current of the nuclear fission ionization box, i.e., the relationship between the extrapolated zero-volt α-ray current and the neutron sensitivity, also differs. Incidentally, in general, a single lot of the nuclear fission substance is used for manufacturing, for example, 12 to 50 neutron detectors. Therefore, it is necessary to classify clearly and supervise the neutron detectors depending on the lot of the nuclear fission substance used for manufacturing the neutron detectors.

Figure 6:
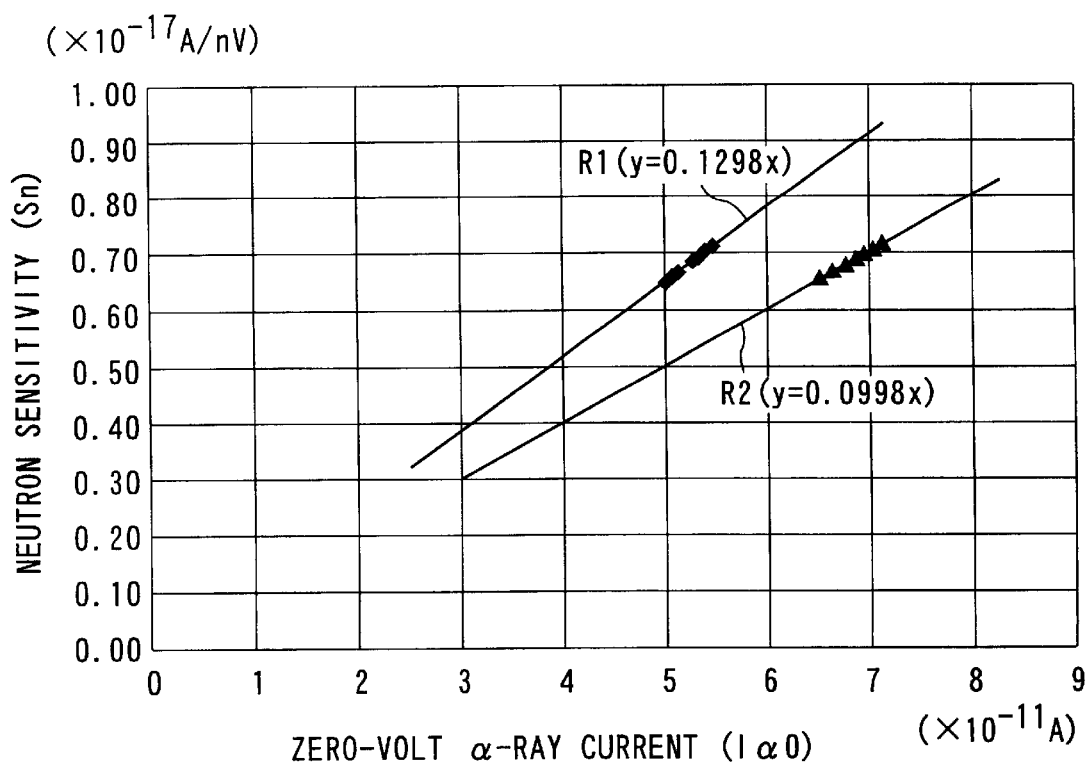
FIG. 6 is a graph showing the relationship between the α-ray current ($I\alpha$) of the nuclear fission substance and the neutron sensitivity, covering the nuclear fission substances differing from each other in the lot, for explaining the method of the present invention for monitoring the neutron sensitivity of a neutron detector.

FIG. 6 is a graph exemplifying the relationship between the α-ray current and the neutron sensitivity in respect of nuclear fission substances differing from each other in the lot. In the graph of FIG. 6, the extrapolated zero-volt α-ray current ($I\alpha_0$) with a unit of $10^{-11}$ A is plotted on the abscissa (x-axis), with the neutron sensitivity Sn with a unit of $10^{-17}$ A/nV being plotted on the ordinate (y-axis). Symbols R1 and R2 shown in the graph represent the characteristics of the nuclear fission substances differing from each other in the lot. For example, the symbol R1 is represented by: y=0.1298x. Also, the symbol R2 is represented by: y=0.0998x.

Where the lots of the nuclear fission substances differ from each other, the relationship between the extrapolated zero-volt α-ray current ($I\alpha_0$) and the neutron sensitivity is obtained in advance for each lot. If the extrapolated zero-volt α-ray current ($I\alpha_0$) is obtained from the monitoring of the α-ray current, it is possible to obtain the neutron sensitivity from the mutual relationship, e.g., from the coefficient of the mutual relationship. According to this method, it is possible to eliminate the error generated from the difference in the lot of the nuclear fission substance.

In the example described above, the mutual relationship between the extrapolated zero-volt α-ray current ($I\alpha_0$) and the neutron sensitivity is obtained for each lot of the nuclear fission substance, and the neutron sensitivity of the individual nuclear fission ionization box is obtained from the mutual relationship noted above and the extrapolated zero-volt α-ray current ($I\alpha_0$). However, if α-ray emitting nuclear species having a short half-life is contained in the nuclear fission substance used, the number of α-ray emissions is decreased with time so as to change the mutual relationship noted above.

An example of the nuclear fission substance, in which the mutual relationship in question is changed, will now be described, covering the case where traces of Ra-228 having a half-life of 5.75 years are mixed in a mixture of U-235 and U-234. In this case, emitted from the nuclear fission substance are the α-ray emitted from U-235 and U-234 and the α-ray emitted from the daughter nuclear species of Ra-228, i.e., from Th-228, Ra-224, Rn-220, Po-216, Bi-212, and Po-212. Any of these daughter nuclear species has a half-life shorter than that of Ra-228, and the state of an equilibrium is reached in several years after manufacture of these daughter nuclear species as the nuclear fission substance. If such a nuclear fission substance is used in a nuclear fission ionization box, the number of α-ray emissions from the Ra-228 series nuclear species is decreased with time, though the situation is dependent on the number of years over which the nuclear species was used.

Figure 7:
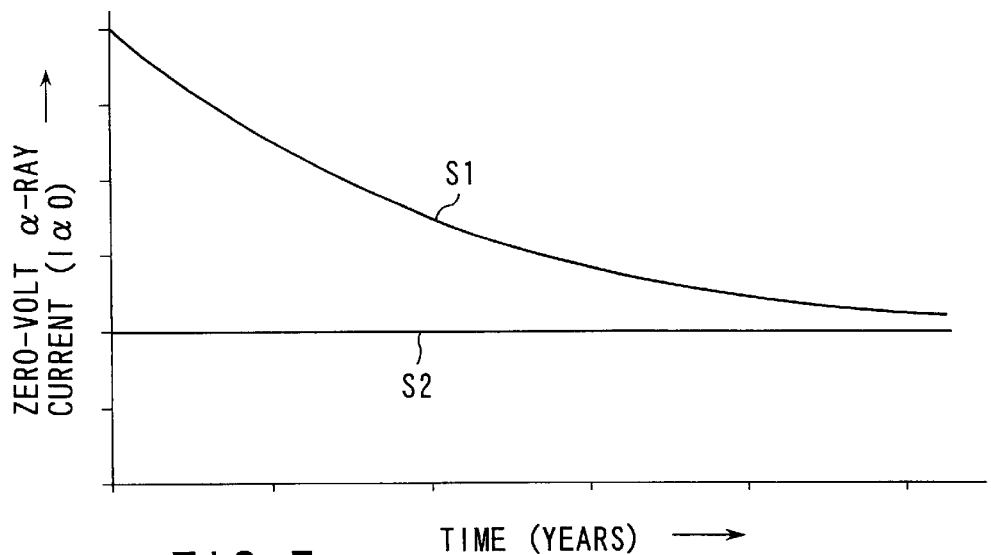
FIG. 7 is a graph showing the change with time in the α-ray current for explaining the method of the present invention for monitoring the neutron sensitivity of a neutron detector.

In the case of, for example, the Ra-228 series, the extrapolated zero-volt α-ray current ($I\alpha_0$) is lowered as denoted by a symbol S1 in the graph of FIG. 7. In the graph of FIG. 7, the number of years is plotted on the abscissa, with the extrapolated zero-volt α-ray current ($I\alpha_0$) being plotted on the ordinate. The line denoted by symbol S2 in FIG. 7 covers a mixture of U-235 and U-234.

As apparent from FIG. 7, the extrapolated zero-volt α-ray current ($I\alpha_0$) is changed with time in the case of the nuclear fission ionization box using a nuclear fission substance containing a substance having a short half-life. Therefore, if the neutron sensitivity determined on the basis of the initial extrapolated zero-volt α-ray current ($I\alpha_0$) is continuously used as it is, the conversion error is enlarged in the step of monitoring the neutron flux.

In this case, a standard detector is specified for looking into, for example, the change with time in the extrapolated zero-volt α-ray current ($I\alpha_0$) for each lot of the nuclear fission substance. Also, the change with time in the decay of the extrapolated zero-volt α-ray current ($I\alpha_0$) of the standard detector is monitored so as to correct the extrapolated zero-volt α-ray current ($I\alpha_0$) of the nuclear fission ionization box manufactured in the same period of time. According to this method, it is possible to eliminate the effect produced by the mixing of an impurity having a short half-life of emitting α-ray.

As described above, in the present invention, an ionizing gas is ionized by the α-ray emitted from a nuclear fission substance housed in a nuclear fission ionization box, and the current flowing within the nuclear fission ionization box in this step is monitored so as to obtain the α-ray current characteristics. Also, the extrapolated zero-volt α-ray current ($I\alpha_0$) is obtained from the α-ray characteristics by, for example, an extrapolating method so as to obtain the neutron sensitivity of the nuclear fission ionization box type nuclear detector. In other words, the present invention provides a method of monitoring the neutron sensitivity, which permits determining the neutron sensitivity of a nuclear fission ionization box type neutron detector without employing the neutron irradiation.

In the embodiment described above, the cathode is coated with a nuclear fission substance. However, it is possible to coat the cathode and/or anode with the nuclear fission substance. Also, it is possible for the nuclear fission substance used for coating the cathode and/or anode to include its parent nuclear species.

According to the present invention, provided is a method of monitoring the neutron sensitivity of a neutron detector, which permits accurately monitoring the neutron sensitivity of the neutron detector without employing the neutron irradiation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for monitoring the neutron sensitivity of a neutron detector, in which at least one of an anode and a cathode arranged to face each other is coated with a nuclear fission substance containing a parent nuclear species and an ionizing gas is loaded in the space between the anode and the cathode, comprising the steps of:

applying voltage of a predetermined potential difference between the anode and the cathode under the state that the nuclear detector is not irradiated with neutrons so as to measure an α-ray current ($I\alpha$) flowing between the anode and the cathode by the ionization gas caused by the α-ray emitted from a nuclear fission substance;

obtaining, with the monitoring region in which the applied voltage and the α-ray current (Iα) bear a substantially linear relationship over a range of at least 50V of the applied voltage, an extrapolated zero-volt α-ray current (Iα$_0$) at 0V of the applied voltage between the anode and the cathode from said proportional relationship by an extrapolating method; and determining said neutron sensitivity based on a correlation between the extrapolated zero-volt α-ray current (Iα$_0$) and a predetermined relationship of neutron sensitivity to zero-volt α-ray current.

2. The method of monitoring the neutron sensitivity of a neutron detector according to claim 1, wherein the voltage applied between the anode and the cathode in the step of measuring said α-ray current (Iα) falls within a range of between 40V and 200V.

3. The method of monitoring the neutron sensitivity of a neutron detector according to claim 1, wherein said α-ray current (Iα) is monitored in said step of monitoring the α-ray current (Iα) in at least two points under different voltage application.

4. A method for monitoring the neutron sensitivity of a neutron detector, comprising the steps of:

preparing a plurality of neutron detectors by coating at least one of an anode and a cathode of each of said plural neutron detectors with a nuclear fission substance containing a parent nuclear species for each lot, applying voltage of a predetermined potential difference between said anode and said cathode of at least one neutron detector sampled from among said plural neutron detectors for each lot without irradiating said neutron detector with neutron so as to monitor the α-ray current (Iα) flowing between the anode and the cathode by the ionization of an ionizing gas caused by the α-ray emitted from said nuclear fission substance;

obtaining, with the monitoring region in which the applied voltage and the α-ray current (Iα) bear a substantially linear relationship over a range of at least 50V of the applied voltage, an extrapolated zero-volt α-ray current (Iα$_0$) at 0V of the applied voltage between the anode and the cathode from said proportional relationship by an extrapolating method; and determining said neutron sensitivity based on a correlation between the extrapolated zero-volt α-ray current (Iα$_0$) and a predetermined relationship of neutron sensitivity to zero-volt α-ray current, the correlated neutron sensitivity being regarded as the neutron sensitivity of the plural neutron detectors for each lot.

5. A method for monitoring the neutron sensitivity of a neutron detector, comprising the steps of:

preparing a plurality of neutron detectors by coating at least one of an anode and a cathode of each of said plural neutron detectors with a nuclear fission substance containing a parent nuclear species for each lot, at least one neutron detector sampled among said plural neutron detectors for each lot being used as a standard neutron detector;

applying voltage of a predetermined potential difference between said anode and said cathode without irradiating said standard neutron detector for each lot with neutron so as to monitor the α-ray current (Iα) flowing between the anode and the cathode by the ionization of an ionizing gas caused by the α-ray emitted from said nuclear fission substance;

obtaining, with the monitoring region in which the applied voltage and the α-ray current (Iα) bear a substantially linear relationship over a range of at least 50V of the applied voltage, an extrapolated zero-volt α-ray current (Iα$_0$) at 0V of the applied voltage between the anode and the cathode from said proportional relationship by an extrapolating method;

determining said neutron sensitivity based on a correlation between the extrapolated zero-volt α-ray current (Iα$_0$) and a predetermined relationship of neutron sensitivity to zero-volt α-ray current; and correcting the decay of the neutron sensitivity caused by the lapse of time from the manufacturing time of the plural neutron detectors for each lot on the basis of the extrapolated zero-volt α-ray current (Iα$_0$) of said standard neutron detector monitored at the lapse of said time to obtain corrected values of the neutron sensitivity of said plural neutron detectors for each lot at the lapse of said time.

* * * * *